(12) United States Patent
Barker et al.

(10) Patent No.: US 7,866,022 B2
(45) Date of Patent: Jan. 11, 2011

(54) METHOD AND SYSTEM OF SUBDUCT AND CABLE INSTALLATION

(75) Inventors: Philip A Barker, Ipswich (GB);
Christopher Fisk, Ipswich (GB);
Andrew J Mayhew, Ipswich (GB);
Simon I Fisher, Ipswich (GB)

(73) Assignee: British Telecommunications Public, London (GB)

( * ) Notice: Subject to any disclaimer, the term of this patent is extended or adjusted under 35 U.S.C. 154(b) by 0 days.

(21) Appl. No.: 10/512,198

(22) PCT Filed: Apr. 15, 2003

(86) PCT No.: PCT/GB03/01629

§ 371 (c)(1),
(2), (4) Date: Oct. 22, 2004

(87) PCT Pub. No.: WO03/092134

PCT Pub. Date: Nov. 6, 2003

(65) Prior Publication Data

US 2005/0198798 A1   Sep. 15, 2005

(30) Foreign Application Priority Data

Apr. 23, 2002  (EP) .................................. 02252828
Mar. 25, 2003  (GB) .................................. 0306848.3

(51) Int. Cl.
*B23P 19/04*  (2006.01)
(52) U.S. Cl. ....................... 29/433; 138/111; 138/119; 226/7

(58) Field of Classification Search ................. 138/149, 138/115, 116, 103, 111, 137, 138, 119; 29/433, 29/709, 421.1, 507; 405/184–484.3, 183.5; 226/7; 156/287; 264/36.17
See application file for complete search history.

(56) References Cited

U.S. PATENT DOCUMENTS

| 6,026,900 A | * | 2/2000 | Keller ................... 166/250.01 |
| 6,251,201 B1 | | 6/2001 | Allen |
| 7,025,580 B2 | * | 4/2006 | Heagy et al. .................. 425/11 |

FOREIGN PATENT DOCUMENTS

| DE | 3731611 A1 | 3/1989 |
| EP | 0785387 A1 | 7/1997 |
| JP | 1034113 | 2/1989 |
| JP | 3052508 | 3/1991 |
| JP | 10248131 | 9/1998 |
| JP | 2001136621 | 5/2001 |

OTHER PUBLICATIONS

European Search Report—Oct. 31, 2002.
International Search Report—Sep. 5, 2003.
Patent Abstracts of Japan, vol. 018, No. 407, Jul. 29, 1994, & JP 06 121426 A (Samu Giken:KK), Apr. 28, 1994.

* cited by examiner

*Primary Examiner*—David P Bryant
*Assistant Examiner*—Christopher M Koehler
(74) *Attorney, Agent, or Firm*—Nixon & Vanderhye P.C.

(57) ABSTRACT

Cable is installed into a duct, by increasing cross-sectional areas of subducting provided in the duct, so as to allow the cable to be received into the subducting, and then decreasing the cross-sectional area of the subducting containing the cable so as to reduce the volume occupied by the subducting in the duct. Cables may be inserted into the subducting, for example, by forcing compressed gas through the subducting, which simultaneously inflates the subducting.

40 Claims, 4 Drawing Sheets

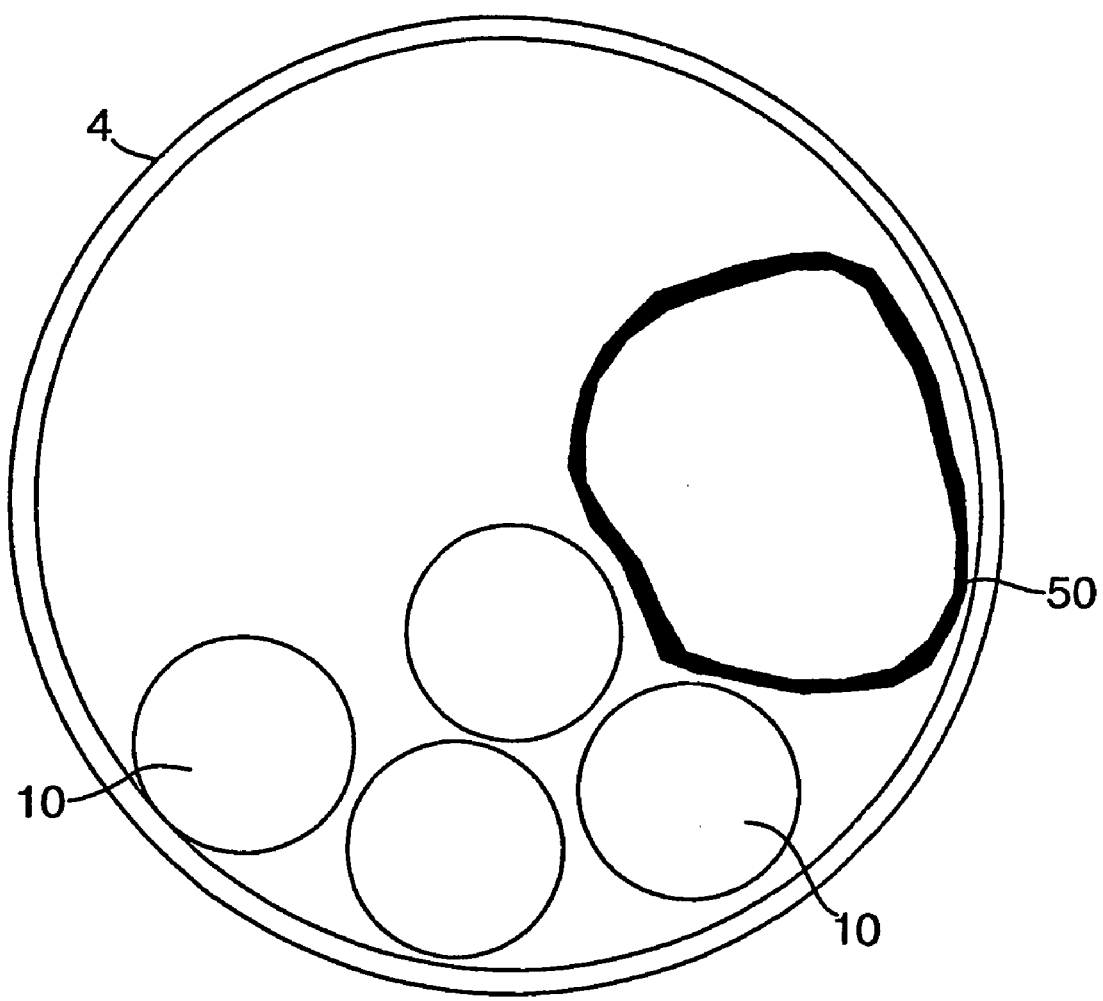

METHOD AND SYSTEM OF SUBDUCT AND CABLE INSTALLATION

BACKGROUND

1. Technical Field

This invention relates to the installation of components and subducting into main ducts. In particular, this invention relates to a method and system for installing a component into a duct, to a method and system for installing subducting in a main duct into which cables may be inserted, and to a subduct.

2. Related Art

It is a common requirement, for example, for telecommunication companies, to install cables into long ducts which may be part of an extensive installed duct network. Many such ducts have limited space for remaining cable installation due to existing installed cables, therefore rendering the installation process difficult. Installation costs are inherently high making duct space a potentially valuable asset. This is true for both partially populated ducts and empty ducts.

A typical installation process can involve the use of compressed gas, which is forced into the duct to provide a viscous flow along the duct, which results in a distributed forward force on the cable being installed. Often this is done in a subduct within the main duct to facilitate the process. This type of process is generally used for the installation of optical fibre cables. A disadvantage of such a system is that more duct space is used than if the cables were installed directly, without the subduct, as adequate space is required for airflow around the cable to allow effective installation. This space is only required during installation or removal of the cable.

BRIEF SUMMARY

The present invention is directed to overcoming or substantially ameliorating the above problems.

According to a first aspect of the present invention, there is provided a method of installing a component into a duct, the method comprising:
 increasing the cross-sectional area of subducting provided within the duct, so as to allow the component to be received into the subducting; and
 decreasing the cross-sectional area of the subducting containing the component, so as to reduce the volume occupied by the subducting in the duct.

According to a second aspect of the present invention, there is provided a system for installing a component into a duct comprising:
 subducting having a variable cross-sectional area;
 means for increasing the cross-sectional area of the subducting so as to allow the component to be received into the subducting; and
 means for decreasing the cross-sectional area of the subducting, so as to reduce the volume occupied by the subducting in the duct.

According to a third aspect of the present invention, there is provided a method of installing subducting into a duct, the subducting having a variable cross-sectional area, the method comprising:
 inserting the subducting into the duct; and
 decreasing the cross-sectional area of the subducting to reduce the volume occupied by the subducting in the duct.

According to a fourth aspect of the present invention, there is provided a system for installing subducting into a duct comprising:
 subducting having a variable cross-sectional area; and
 means for decreasing the cross-sectional area of the subducting to reduce the volume occupied by the subducting in the duct.

According to a fifth aspect of the present invention, there is provided a subduct, arranged such that:
 the cross-sectional area of the subduct can be increased so as to allow a component to be received into the subduct; and
 the cross-sectional area of the subduct containing the component can be decreased, so as to reduce the volume occupied by the subducting.

BRIEF DESCRIPTION OF THE DRAWINGS

The invention will now be described by way of example only with reference to the accompanying drawings, in which:

FIG. 6b is a perspective view of the pressurised chamber forming part of the equipment of FIG. 6a;

FIG. 10 is a cross-section of the second subducting in an inflated state in the main duct.

DETAILED DESCRIPTION OF EXEMPLARY EMBODIMENTS

Figure 1:
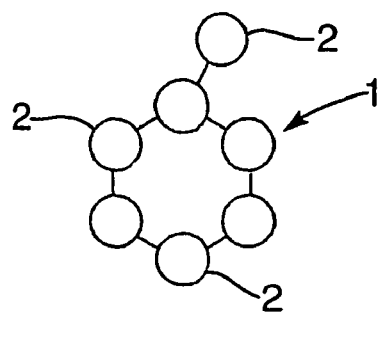
FIG. 1 is a cross-section of the subducting embodying an exemplary embodiment of the invention, as manufactured in a pre-inverted state.

The subducting shown in FIG. 1 comprises a multi-subduct 1 embodying an exemplary embodiment of the invention, comprising a number of subducts 2 connected together along their length. The subducts 2 are shown in an inflated state in FIG. 1 and are illustrated in an inverted (that is inside-out) state with the normally inside surface forming the outer surface in this state. In this preferred embodiment, the multi-subduct is manufactured in this inverted (inside-out) state.

Figure 2:
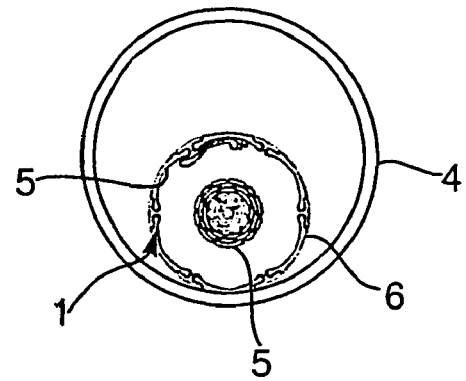
FIG. 2 is a cross-section of the subducting of FIG. 1 being inflated within a main duct.

The multi-subduct 1 is shown in FIG. 2 in an uninflated state and in the process of installation into a main duct 4. The subduct 1 in the inverted state is partially inverted into the main duct 4. As the subduct 1 is installed, it is turned inside out thereby forcing the outside surface in this state (which is the normally inside surface 5) to become the inside surface, and the normally outside surface 6 to become the outer surface. This process is described in detail below.

Figure 3:
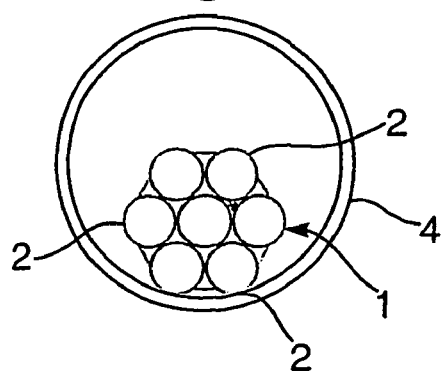
FIG. 3 is a cross-section of the subducting of FIGS. 1 and 2 in an inflated state within a main duct.

FIG. 3 shows a multi-subduct 1 installed within a main duct 4 with the individual subducts 2 of the multi-subduct 1 inflated.

Figure 4:
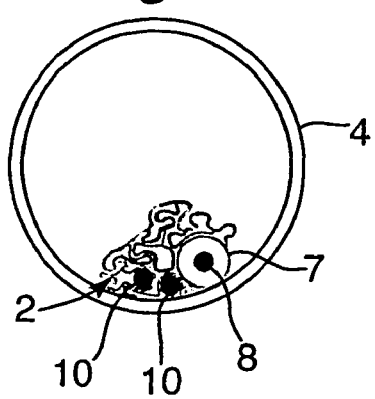
FIG. 4 is a cross-section of the subducting of FIGS. 2 and 3 installed in a main duct with one subduct in the inflated state.

FIG. 4 shows the multi-subduct 1 installed in the main duct 4 in its generally uninflated state, but with one subduct 7 inflated as the cable 8 is being installed through the centre thereof. Other cables 10 are shown installed in other subducts 2 located within the main duct 4.

Figure 5A:
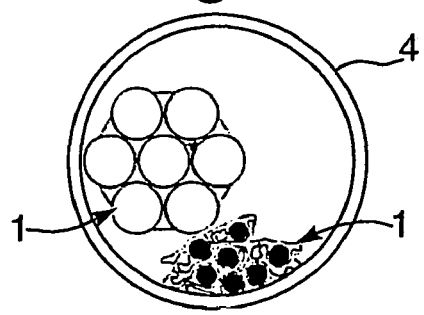
FIGS. 5a and 5b are cross-sections of the subducting of FIGS. 2 to 4 in which a multiple subduct is inflated and installed in the main duct, and a plurality of subducts are shown deflated after cables have been inserted therein.
Figure 5B:
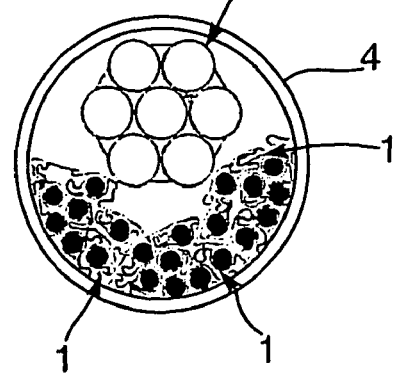

A plurality of fully populated multi-subducts 1 may be inserted into the main duct 4, as shown in FIGS. 5a and 5b.

Figure 6A:
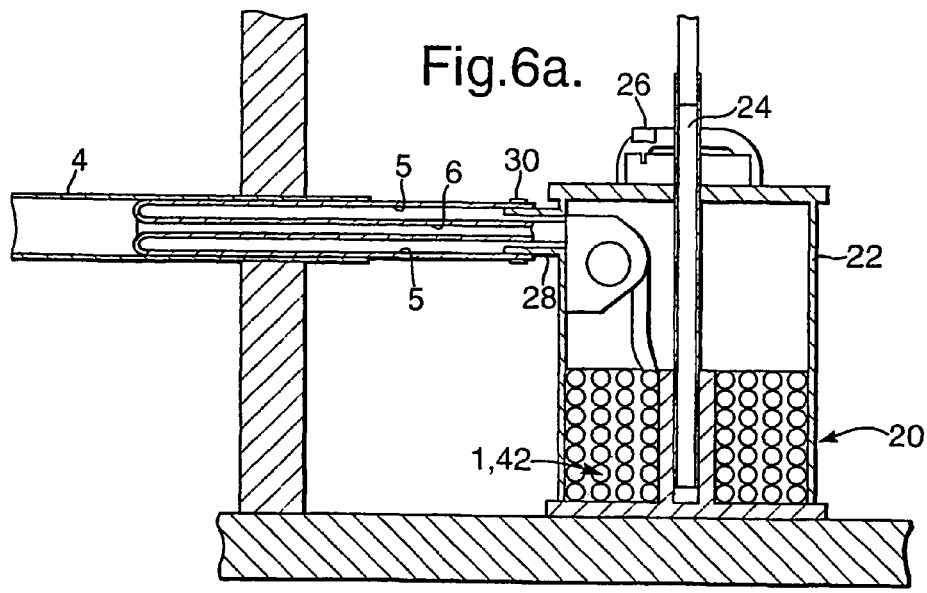
FIG. 6a is a sectional view of installation equipment for installing the subducting of FIGS. 1 to 5 in a main duct.
Figure 6B:
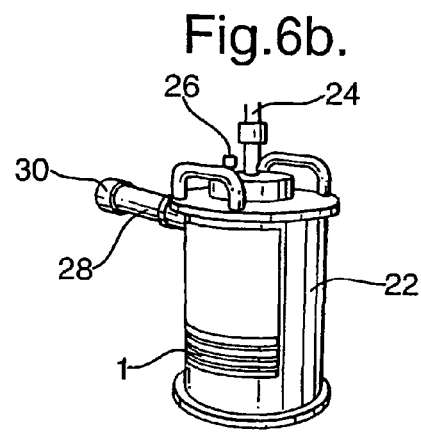

The installation equipment 20 for use in the installation of the ducting embodying the invention is shown in FIGS. 6a and 6b. The equipment comprises a pressurised chamber 22 containing a multi-subduct 1 to be installed. The multi-subduct 1 is coiled in its inverted (inside-out) state within the pressurised chamber 22, and a gas supply 24 is connected to an inlet of the pressurised chamber 22. A safety valve 26 is also connected to the pressurised chamber 22. A delivery tube 28 is connected to an outlet of the pressurised chamber 22. A free end of the multi-subduct 1 is clamped using a clamp 30 to the free end of the delivery tube 28.

The pressure of the gas in the pressurized chamber 22 forces the multi-subduct 1 in the pressurized chamber out through the delivery tube 28 and into the main duct 4, turning it inside out in the process such that the initially outside surface 5 is the inside surface as installed and the initially inside surface 6 forms the outer surface as installed.

Figure 7A:
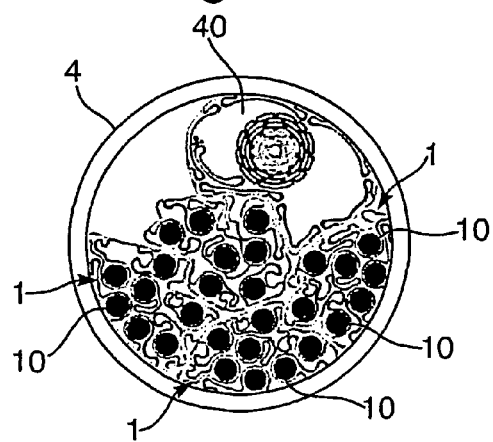
FIGS. 7a and 7b are cross-sectional views of the subducts shown in FIGS. 2 to 5b in a high density cable installation with multiple and single cable capacity subducts inserted in the main duct.

FIG. 7a shows a multi-subduct 40 being inserted into a main duct 4 in which there are already installed a number of cables 10 located within installed subducts 1 which are in the uninflated state.

Figure 7B:
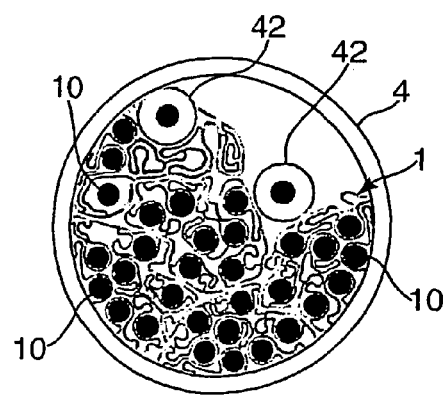

FIG. 7b shows single subducts 42 being inserted into a main duct 4 in addition to existing multi-subducts 1 which have already been installed in the main duct 4 and are now in the uninflated state. Such a configuration is particularly advantageous in situations where there is insufficient room in the main duct 4 to accommodate multi-subducts.

The method of installing ducting will now be described by way of example.

When manufactured, the single subduct 42 or multi-subduct 1 is produced inside out with its normally inside surface forming the outer surface. This enables the subducting to be installed by inverse inflation, which involves blowing the subduct or multi-subduct into a main duct 4 and turning it inside out in the process.

The single subduct 42 or multi-subduct 1, as manufactured, is coiled and is placed in the pressurised chamber 22, as shown in FIGS. 6a and 6b. One end of the subduct 42 or 1 is fed through the delivery tube 28 and is then folded back over the free end of the delivery tube and clamped thereto, using a clamp 30. Compressed gas is blown into the pressurised chamber 22 from a compressed gas supply 24 and this raises the pressure in the delivery tube 28 connected thereto, forcing the subduct or multi-subduct 1 out of the pressurised chamber 22 and down the delivery tube 28, turning it inside out in the process as it passes outside the delivery tube, as shown in FIGS. 2 and 7a. The subduct 42 or 1 is then fed into the main duct 4 and is forced therealong to the desired length or position, whilst continuing to be turned inside out as it moves along the main duct 4.

Removing the pressure and disconnecting the subduct 42 or 1 from the pressurised chamber 22 causes the ducting to collapse, for example, due to gravity, as shown in FIGS. 4, 5a, 5b, 7a and 7b. Cables 8 may then be inserted in each subduct 1 or 42 and fed along the subduct by blowing compressed gas through this subduct to inflate it and provide a viscous flow through which the cables 8 can propagate. Once the cables 8 are inserted into the subduct 1 or 42, the gas pressure is removed and the subduct 1 or 42 collapses around the cable 8 as it deflates, as shown in FIGS. 4, 5a, 5b, 7a and 7b.

Multi-subducts of the type illustrated, for example, in FIGS. 1, 3, 5a, 5b, 7a and 7b can be inserted, but if there is insufficient room in the main duct 4 to accommodate such multi-subducts, single sub-ducts 42 may be used to fill the remaining spaces, as shown in FIG. 7b.

Various modifications may be made to the present invention, for example, whilst the embodiments described above refer to increasing the cross-sectional area of the subduct by application of an additional flow of compressed gas, the area could be increased by the gas flow which is used for the insertion of the cable into the subduct.

Figure 8:
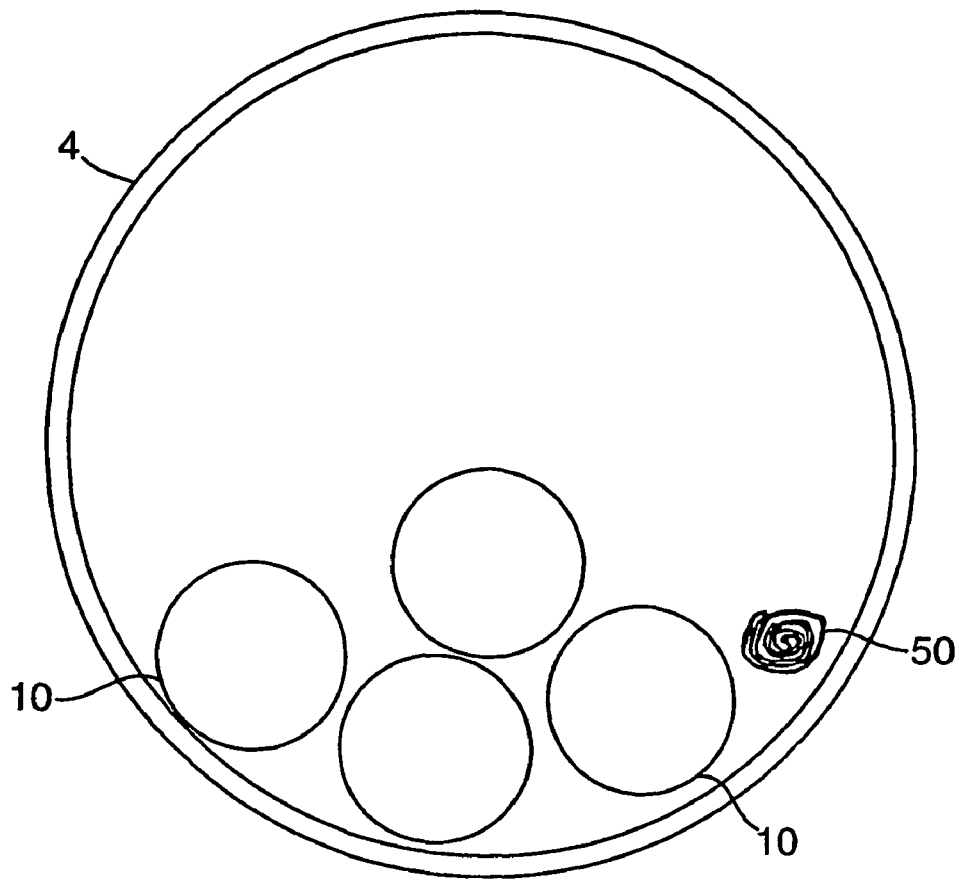
FIG. 8 is a cross-section of a second subducting installed in a main duct with a plurality of cables.

FIG. 8 shows a second type of subducting, comprising a single subduct 50, installed in a main duct 4 containing a plurality of cables 10. Subduct 50, is illustrated in cross-section in a state immediately following the process of installation of the subduct. It will be understood that the longitudinal axis of the subduct extends perpendicularly into and out from the paper, i.e. substantially parallel to the longitudinal axes of the main duct 4 and cables 10. An enlarged view of the cross-section of subduct 50 is shown in FIG. 9.

Figure 9:
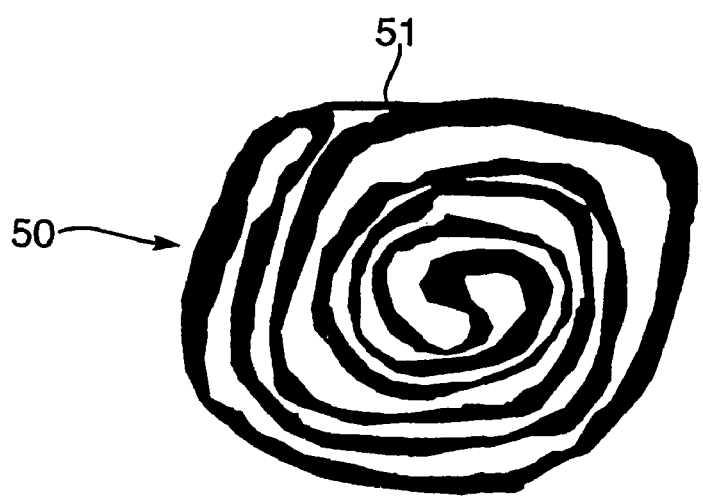
FIG. 9 is an enlarged, cross-sectional view of the second subducting of FIG. 8.

Subduct 50 has been formed during manufacture into the tightly rolled configuration shown in FIG. 9. As such, the subduct takes up only the minimum volume possible within the duct 4. Subduct 50 is held in this rolled configuration by means of a retention seal 51 running substantially along the whole length of the subduct, and thereby preventing the subduct from unravelling (i.e. unrolling).

Installation of the subduct 50 into the duct 4 is by means of any standard known method in the field, namely by pulling in using a rope or by attaching to a pneumatic duct motor. Once installed, the subduct 50 can remain in the rolled configuration for as long as necessary until required.

When it is desired to install a component, such as a cable, into the duct 4, a supply of pressurised gas is connected so as to inflate the subduct 50 into the inflated state illustrated in FIG. 10, into which the cable can be received. Initially, sufficient pressurisation of the subduct 50 must occur so as to break the retention seal 51, thereby allowing the subduct 50 to unravel from the spiral configuration and fully inflate, thereby substantially increasing in cross-sectional area. A cable is inserted into the subduct under the action of blowing compressed gas through the subduct, simultaneously causing the subduct to inflate and providing a viscous flow through which the cable propagates. After installation of the cable, the pressurised gas supply is removed, and the subduct 50 allowed to deflate and collapse under the influence of gravity.

The action of the subduct 50 collapsing when the pressurised gas supply is removed causes a significant reduction in the volume taken up by the subduct 50 compared with its previous inflated state. Advantageously this means that significantly more cables can be installed into a duct than would otherwise be the case with solid subducting. Additionally, the tightly wound configuration of the manufactured subduct 50 means that a plurality of subducts can be inserted into the duct 4, all in their rolled configuration, in advance of the cables, and then only inflated individually as needed.

Although the embodiment of FIG. 9 is shown in a generally spiral-shaped configuration, further variations are envisaged. The subduct may instead be concertinaed, or otherwise folded, or in part folded and partially rolled in any suitable configuration which allows ease of unravelling (i.e. unrolling or unfolding as necessary) upon inflation using a pressurised gas supply. In addition, the retention seal 51 may by replaced by a plurality of tags spaced at intervals along the length of the subduct, or retention means which encircles the circumference of the rolled subduct, so long as such retention means are arranged to break under sufficient pressurisation of the subduct.

Although the duct shown in FIG. 8-10 comprises a single bore subduct, this could alternatively be provided as a multiple-bore subduct, thereby reducing the number of subduct installations required.

Still further modifications may be made to the embodiments described herein. Whilst the variation of cross-sectional area of subducting has been described as being a result of using a highly flexible material which can be inflated using compressed gas and which naturally deflates due to gravity, the increase in cross-sectional area may also be achieved by using mechanical expansion or material expansion of the subduct.

The system and method embodying the invention is particularly advantageous as it can replace traditional solid subducts used, for example, in the installation of fibre cables in cabling networks. It is also advantageous in situations where existing ducts are already installed and new subducting is required to be inserted. The fibre count within existing ducts may be increased either by replacement of the installed cable with a multi-subduct embodying the invention, or addition of subducts embodying the invention to the existing installed cable network. The bore diameter of the subduct embodying the invention may be chosen to best fit the cables to be installed. Such cables may be, for example, traditional blown cables or micro cables. A particular advantage of the subducting embodying the invention over traditional subducting is the reduction in duct space used by each installed cable. Furthermore, the invention enables cable installation into heavily congested ducts resulting in a reduction in the required duct build along existing duct routes.

Thus the embodiments of the invention have considerable economical advantages and the advantage of ease of insertion.

The subducting embodying the invention may be formed of highly flexible material, preferably of composite construction and which naturally deflates due to gravity. Furthermore, the subducting embodying the invention preferably has physical properties that enable a cable to be installed into it by the application of a flow of compressed air. Such requirements may include an ability to withstand pressurisation to at least 10 bar, a natural tendency to deflate, a tendency to become rigid when pressurised, a low friction inner surface, and being resistant to wear caused by contact with cables being installed. The sub-ducts ducts embodying the invention may be may be termed "Pneumatic Single Sub-ducts" (PSS) or "Pneumatic Multi-Subducts" (PMS).

In a further embodiment (not shown), subduct connectors may be used to assist in the construction of long lengths of subducting. These connectors should be capable of withstanding the working pressure and be designed to cause minimal restriction to the subduct bore.

As will be understood from above, a component can be installed into a duct by increasing the cross-sectional area of subducting provided within the duct, so as to allow the component to be received into the subducting; and decreasing the cross-sectional area of the subducting containing the component, so as to reduce the volume occupied by the subducting in the duct. The subducting is preferably formed of a flexible material and the step of increasing the cross-sectional area of the subducting involves unravelling the flexible material of the subducting. The step of increasing the cross-sectional area of the subducting may involve mechanically or otherwise expanding the subducting and/or material forming the subducting to increase the area. For example, the subducting may be connected to a supply of compressed gas, which is activated forcing gas through the subducting to increase the cross-sectional area of the subducting. A component may be propagated through the subducting via the action of the gas forced through the subducting. The step of decreasing the cross-sectional area may involve allowing the subducting to collapse under gravity, or to deflate. The subducting may be inserted into the duct via inversion.

A system for installing a component into a duct may include subducting having a variable cross-sectional area; means for increasing the cross-sectional area of the subducting so as to allow the component to be received into the subducting; and means for decreasing the cross-sectional area of the subducting, so as to reduce the volume occupied by the subducting in the duct. The subducting is preferably formed of a flexible material. The subducting may include a plurality of subducts for receiving a plurality of components. The system may further include a supply of compressed gas connectable to the subducting for forcing gas through the subducting to increase the cross-sectional area of the subducting. In fact, a supply of compressed gas may be connected to the subducting to force gas through the subducting so as to propagate a component though the subducting. The material of the subducting is preferably arranged in a configuration which unravels on the supply of pressurized gas into the subducting, so as to increase in cross-sectional area of the subducting.

The subducting may comprise retention structure arranged so as to prevent increase of the cross-section area of the subducting by unraveling until a predetermined pressurization of the subducting occurs. A system may include a supply of compressed gas connectable to the subducting for forcing gas through the subducting such that the subducting may be inserted into a duct via inversion.

Subducting may be installed into a duct, the subducting having a variable cross-sectional area, by inserting the subducting into the duct and decreasing the cross-sectional area of the subducting to reduce the volume occupied by the subducting in the duct. Such installation of subducting may also include increasing the cross-sectional area of the subducting for receiving components into the subducting before the step of decreasing the cross-sectional area of the subducting to reduce the volume occupied by the subducting in the duct. The subducting is preferably formed of a flexible material. The step of increasing the cross-sectional area of the subducting may include mechanically expanding the subducting to increase the area or expanding the material forming the subducting. The subducting may be connected to a supply of compressed gas which is activated to force gas through the subducting to increase the cross-sectional area of the subducting. The step of activating the supply of compressed gas to force gas through the subducting to increase the cross-sectional area of the subducting may occur while inserting the subducting into the duct. The step of decreasing the cross-sectional area may involve allowing the subducting to collapse under gravity, or to deflate. The step of activating the supply of compressed gas to force gas through the subducting may include turning the subducting inside out as gas is forced along the subducting. The step of turning the subducting inside out may occur as the subducting is being inserted into the duct.

A system for installing subducting into a duct may include subducting having a variable cross-sectional area and means for decreasing the cross-sectional area of the subducting to reduce the volume occupied by the subducting in the duct. The system may also include means for increasing the cross-sectional area of the subducting for receiving components into the subducting prior to decreasing the cross-sectional area of the subducting to reduce the volume occupied by the subducting in the duct. The subducting is preferably formed of a flexible material. The subducting preferably includes a plurality of subducts for receiving a plurality of components. The system may include a supply of compressed gas connectable to the subducting for forcing gas through the subducting to increase the cross-sectional area of the subducting. The supply of compressed gas may be operable to force gas through the subducting to increase the cross-sectional area of the subducting while inserting the subducting into the duct. The supply of compressed gas may be connectable to the subducting such that activation of the supply of compressed gas forces gas through the subducting causing the subducting to turn inside out. The subducting may be arranged to turn inside out while the subducting is being inflated.

A subduct may be arranged such that the cross-sectional area of the subduct can be increased so as to allow a component to be received into the subduct; and the cross-sectional area of the subduct containing the component can be decreased, so as to reduce the volume occupied by the subducting. A subduct of this type may be made of material arranged in a configuration capable of being unravelled so as to increase the cross-sectional area of the subduct. The subduct configuration of material may be a generally spiral configuration. The subduct may include means for receiving a supply of pressurized gas into the subduct, and arranged such that the cross-sectional area of the subduct is increased by the supply of pressurized gas.

The subduct may receive in use a component introduced into the subduct via the action of pressurized gas. The material of the subduct may be such that after the cross-sectional area of the subduct has been increased, the material will collapse under gravity so as to decrease the cross-sectional area of the subduct.

What is claimed is:

1. A method of installing a component into a duct, the method comprising:
   increasing the cross-sectional area of subducting provided within the duct under action of compressed gas blown in from a first end and out from a second end of the subducting so as to allow a component to propagate into the first end and out from the second end of the subducting under action of compressed gas blown through the subducting; and
   decreasing the cross-sectional area of the subducting containing the component, so as to reduce the volume occupied by the subducting in the duct.

2. A method of installing a component into a duct as in claim 1, wherein the subducting is formed of a flexible material.

3. A method of installing a component into a duct as in claim 1, wherein the step of increasing the cross-sectional area of the subducting comprises unravelling material of the subducting.

4. A method of installing a component into a duct as in claim 1, wherein the step of increasing the cross-sectional area of the subducting comprises mechanically expanding the subducting to increase the area.

5. A method of installing a component into a duct as in claim 1, wherein the step of increasing the cross-sectional area of the subducting comprises expanding the material forming the subducting.

6. A method of installing a component into a duct as in claim 1, further comprising:
   connecting the subducting to a supply of compressed gas, and
   activating the supply of compressed gas to force gas through the subducting to increase the cross-sectional area of the subducting.

7. A method of installing a component into a duct as in claim 6, further comprising:
   propagating a component through the subducting via action of gas forced through the subducting.

8. A method of installing a component into a duct as in claim 1, wherein the step of decreasing the cross-sectional area comprises allowing the subducting to collapse under gravity, or to deflate.

9. A method of installing a component into a duct as in claim 1, further comprising:
   inserting the subducting into the duct via inversion.

10. A system for installing a component into a duct, said system comprising:
    subducting provided in the duct and having a variable cross-sectional area;
    means for increasing the cross-sectional area of the subducting under action of compressed gas blown in from a first end and out from a second end of the subducting so as to allow a component to propagate into the first end and out from the second end of the subducting under action of compressed gas blown through the subducting; and
    means for thereafter decreasing the cross-sectional area of the subduct, so as to reduce the volume occupied by the subducting in the duct.

11. A system for installing a component into a duct as in claim 10, wherein the subducting is formed of a flexible material.

12. A system for installing a component into a duct as in claim 10, wherein the subducting comprises a plurality of subducts for receiving a respectively corresponding plurality of components.

13. A system for installing a component into a duct as in claim 10, the system further comprising:
    a supply of compressed gas connectable to the subducting for forcing gas through the subducting to increase the cross-sectional area of the subducting.

14. A system for installing a component into a duct as in claim 10, further comprising:
    a supply of compressed gas connectable to the subducting for forcing gas through the subducting so as to propagate a component though the subducting.

15. A system for installing a component into a duct as in claim 10, wherein material of the subducting is arranged in a configuration which unravels on the supply of pressurized gas into the subducting, so as to increase cross-sectional area of the subducting.

16. A system for installing a component into a duct as in claim 15, wherein the subducting comprises retention means arranged so as to prevent increase of cross-sectioned area of the subducting by unraveling until a predetermined pressurization of the subducting occurs.

17. A system for installing a component into a duct as in claim 10, further comprising:
    a supply of compressed gas connectable to the subducting for forcing gas through the subducting such that the subducting may be inserted into a duct via inversion.

18. A method of installing subducting into a duct, the subducting having a variable cross-sectional area, the method comprising:
    inserting the subducting into the duct while increasing its cross-sectional area under action of compressed gas blown in from a first end and out from a second end of the subducting;

propagating a component into the first end and out from the second end of the subducting under action of compressed gas blown through the subducting; and thereafter decreasing the cross-sectional area of the subducting to reduce the volume occupied by the subducting in the duct.

19. A method as in claim 18, further comprising:

increasing the cross-sectional area of the subducting for receiving components there into and thereafter decreasing the cross-sectional area of the subducting to reduce the volume occupied by the subducting in the duct.

20. A method as in claim 18 wherein the subducting is formed of a flexible material.

21. A method as in claim 18 wherein the step of increasing the cross-sectional area of the subducting comprises mechanically expanding the subducting to increase the area.

22. A method as in claim 18 wherein the step of increasing the cross-sectional area of the subducting comprises expanding the material forming the subducting.

23. A method as in claim 18 further comprising:

connecting the subducting to a supply of compressed gas, and activating the supply of compressed gas to force gas through the subducting to increase the cross-sectional area of the subducting.

24. A method as in claim 23, wherein the step of activating the supply of compressed gas to force gas through the subducting to increase the cross-sectional area of the subducting occurs while inserting the subducting into the duct.

25. A method as in claim 18 wherein the step of decreasing the cross-sectional area comprises allowing the subducting to collapse under gravity, or to deflate.

26. A method as in claim 18, wherein the step of activating the supply of compressed gas to force gas through the subducting includes turning the subducting inside out as gas is forced along the subducting.

27. A method as in claim 18, wherein the step of turning the subducting inside out occurs as the subducting is being inserted into the duct.

28. A system for installing subducting into a duct, said system comprising:

subducting having a variable cross-sectional area;

means for decreasing the cross-sectional area of the subducting to reduce the volume occupied by the subducting in the duct; and means for increasing the cross-sectional area of the subducting under action of compressed gas blown in from a first end and out from a second end of the subducting for propagating components into the first end and out from the second end of the subducting under action of compressed gas blown through the subducting prior to decreasing the cross-sectional area of the subduct to reduce the volume occupied by the subducting in the duct.

29. A system as in claim 28, wherein the subducting is formed of a flexible material.

30. A system as in claim 28, wherein the subducting comprises a plurality of subducts for receiving a respectively corresponding plurality of components.

31. A system as in claim 28, the system further comprising:

a supply of compressed gas connectable to the subducting for forcing gas there through to increase its cross-sectional area.

32. A system as in claim 31, wherein the supply of compressed gas is operable to force gas through the subducting to increase its cross-sectional area while inserting the subducting into the duct.

33. A system as in claim 31, wherein the supply of compressed gas is connectable to the subducting such that activation of the supply of compressed gas forces gas through the subducting causing the subducting to turn inside out as it is being installed in the duct.

34. A system as in claim 33, wherein the subducting is arranged to turn inside out while the subducting is being inflated.

35. A subduct being arranged such that:

the cross-sectional area of the subduct can be increased under action of compressed gas blown in from a first end and out from a second end of the subduct to allow a component to propagate into the first end and out the second end of the subduct under action of compressed gas blown through the subducting; and the cross-sectional area of the subduct containing the component thereafter can be decreased to reduce the volume occupied by the subduct.

36. A subduct as in claim 35, in which material thereof is arranged in a configuration capable of being unraveled so as to increase its cross-sectional area.

37. A subduct as in claim 36, in which the configuration of the subduct material is a generally spiral configuration.

38. A subduct as in claim 35, further comprising:

means for receiving a supply of pressurized gas into the subduct, and arranged such that the cross-sectional area of the subduct is increased by the supply of pressurized gas.

39. A subduct as in claim 35, for receiving in use a component introduced into the subduct via the action of pressurized gas.

40. A subduct as in claim 35, in which material thereof is such that after the cross-sectional area of the subduct has been increased, the material will collapse under gravity so as to decrease its cross-sectional area.

* * * * *